United States Patent
Bold et al.

(10) Patent No.: US 8,352,765 B2
(45) Date of Patent: *Jan. 8, 2013

(54) DARK WAKE

(75) Inventors: Ethan Bold, San Francisco, CA (US); Stuart Cheshire, San Jose, CA (US); J. Rhoads Hollowell, Lafayette, CO (US); Joe Liu, Cupertino, CA (US); R. Dean Reece, Foster City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,676

(22) Filed: Aug. 1, 2011

(65) Prior Publication Data

US 2011/0289334 A1 Nov. 24, 2011

Related U.S. Application Data

(63) Continuation of application No. 12/479,750, filed on Jun. 5, 2009, now Pat. No. 7,996,694.

(51) Int. Cl.
*G06F 1/32* (2006.01)

(52) U.S. Cl. .................. 713/320; 713/300; 713/324

(58) Field of Classification Search ............... 713/300, 713/320, 324; 709/225, 226

See application file for complete search history.

(56) References Cited

U.S. PATENT DOCUMENTS

| | | | |
|---|---|---|---|
| 5,513,361 A | 4/1996 | Young | |
| 5,848,282 A | 12/1998 | Kang | |
| 6,037,732 A | 3/2000 | Alfano et al. | |
| 6,266,776 B1 | 7/2001 | Sakai | |
| 6,289,464 B1 | 9/2001 | Wecker et al. | |
| 6,681,244 B1 | 1/2004 | Cross et al. | |
| 6,694,366 B1 | 2/2004 | Gernert et al. | |
| 7,636,863 B2 | 12/2009 | Oh | |
| 7,996,694 B2 * | 8/2011 | Bold et al. | 713/320 |
| 2004/0218614 A1 | 11/2004 | Yokomitsu et al. | |
| 2006/0025181 A1 | 2/2006 | Kalofonos et al. | |

\* cited by examiner

*Primary Examiner* — Paul Yanchus, III

(74) *Attorney, Agent, or Firm* — Blakely, Sokoloff, Taylor & Zafman LLP

(57) ABSTRACT

Exemplary embodiments of methods, apparatuses, and systems for powering up select components of a computer from a sleep state, maintaining a network state, and powering down the select components of the computer to return the computer to the sleep state are described. For one embodiment, a network interface and a fan controller receive power during the network state maintenance but a display or audio components do not receive power during the network state maintenance.

20 Claims, 4 Drawing Sheets

DARK WAKE

This application is a continuation of U.S. patent application Ser. No. 12/479,750 filed on Jun. 5, 2009, now U.S. Pat. No. 7,996,694.

FIELD

The various embodiments described herein relate to power management of a processing system. In particular, embodiments include the processing system entering a dark wake state from a from a low power state by powering up select components, maintaining a network state, and returning to the sleep state.

BACKGROUND

Computer systems are often used to perform various tasks over a network. When a computer system connects to a network, it establishes a network state with a server or another networked device. In order to make efficient use of network resources, network states may expire and can be periodically maintained or renewed. Additionally, a computer system may periodically update a network state. If the computer system is placed in a low power state (e.g., a sleep state), however, the computer system typically terminates the network state (e.g., allows it to expire) or periodically "wakes up" to a full power state (including user-perceptible components such as video and audio), to maintain, renew, or otherwise update an existing network state.

SUMMARY OF THE DESCRIPTION

Exemplary embodiments of methods, apparatuses, and systems for powering up select components of a computer from a sleep state, maintaining a network state, and powering down the select components of the computer to return the computer to the sleep state are described. For one embodiment, the select components include a network interface and do not include a display or audio components. For one embodiment a fan controller receives power during the maintaining of the network state. These embodiments allow a system to appear to a user to be asleep while performing maintenance of the network state but also continue to protect the system from overheating by keeping the fan controller on. The fan controller can include subsystems which monitor temperature and determine whether to turn a fan on or off; for example, the fan controller can include temperature sensors and processing logic that determines, using information from the temperature sensors whether to turn on or off a fan or other cooling device in order to protect the system. For one embodiment, the fan controller receives power even while the system is in one or more levels of sleep.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Figure 1:
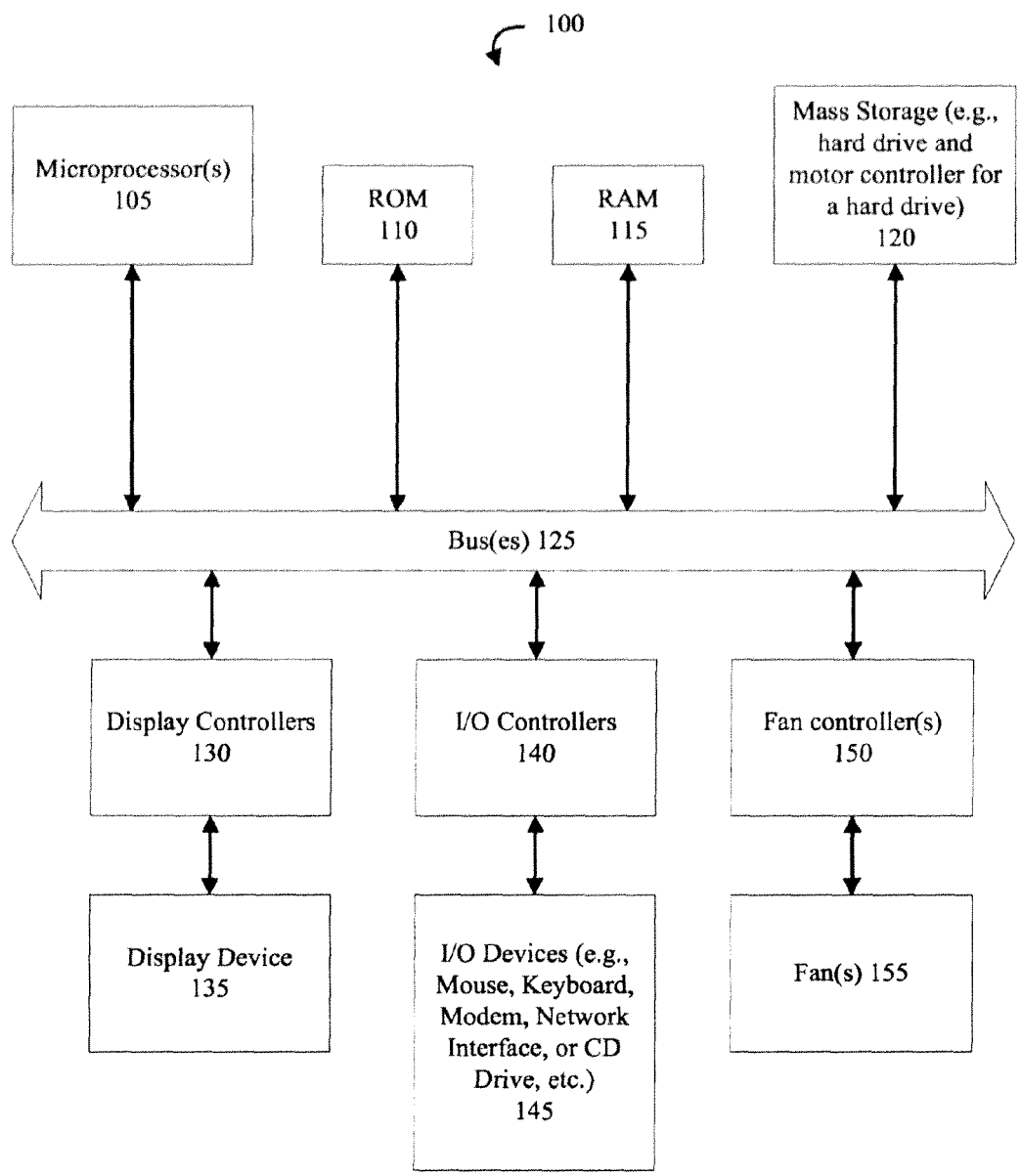
FIG. 1 illustrates an exemplary computer system that can perform network maintenance or updates during a dark wake according to an embodiment.

FIG. 1 illustrates an exemplary computer system 100, also known as a data processing system that can, for example, perform a dark wake as described with reference to FIGS. 2-3. For one embodiment, the operations, processes, modules, methods, and systems described and shown in the accompanying figures of this disclosure are intended to operate on one or more exemplary computer systems 100 as sets of instructions (e.g., software), also known as computer implemented methods. The exemplary computer system 100 is generally representative of personal or client computers, and servers. The exemplary computer system 100 includes at least processor 105 (e.g., a Central Processing Unit (CPU), a core of a multi-core processor, or a combination thereof), a Read Only Memory (ROM) 110, a Random Access Memory (RAM) 115, and a Mass Storage 120 (e.g., a hard drive) which communicate with each other via a bus or buses 125. The mass storage 120 may additionally include, or be coupled to, a controller to control a motor for a hard drive.

The exemplary computer system 100 further includes a Display Controller 130. Display Controller 130 may include one or more GPUs. The computer system 100 also includes a Display Device 135 (e.g., Liquid Crystal Display (LCD) or a Cathode Ray Tube (CRT) or a touch screen, plasma display, light-emitting diode (LED) or organic light-emitting diode (OLED) display, etc.), an I/O Controller 140, an I/O Devices 145 (e.g., mouse, keyboard, modem, network interface, CD drive, etc.), one or more fans or other cooling devices 155, and a speaker and/or one or more audio outputs (not shown). The computer system 100 may also include one or more signal input devices e.g. a microphone, camera, fingerprint scanner, etc.) which are not shown.

The network interface device may include a network card, network adapter, network interface controller (NIC), network interface card, or LAN adapter and is a computer hardware component designed to allow the computer system 100 to communicate over a computer network. The network interface may be connected to a network via wiring or may be wireless, for communicating to a wireless network. Exemplary networks may include a Local Area Network (LAN), Wide Area Network (WAN), Metropolitan Area Network (MAN), Personal Area Network (PAN), Virtual Private Network (VPN), Campus Area Network (CAN), Storage Area Network (SAN), etc.

The fan controller 150 can include subsystems which monitor temperature and determine whether to turn a fan 155 on or off; for example, the fan controller 150 can include temperature sensors and processing logic that determines, using information from the temperature sensors whether to turn on or off a fan 155 or other cooling device in order to protect the system. The fan controller 150 can include software (e.g., by the operating system via a processor), dedicated hardware, a thermostatic device (e.g., a thermistor), or a combination thereof.

The mass storage 120 includes a machine-readable storage medium (computer-readable storage medium/computer-readable recorded medium) on which is stored one or more sets of instructions (e.g. software) embodying any one or more methodologies or functions. The software may also reside, completely or at least partially, within the RAM 115 or ROM 110 and/or within the processor 105 during execution thereof by the computer system 100, the RAM 115, ROM 110, and within the processor 105 also constituting machine-readable storage media. The software may further be transmitted or received over a network (not shown) via a network interface device 145.

Figure 2:
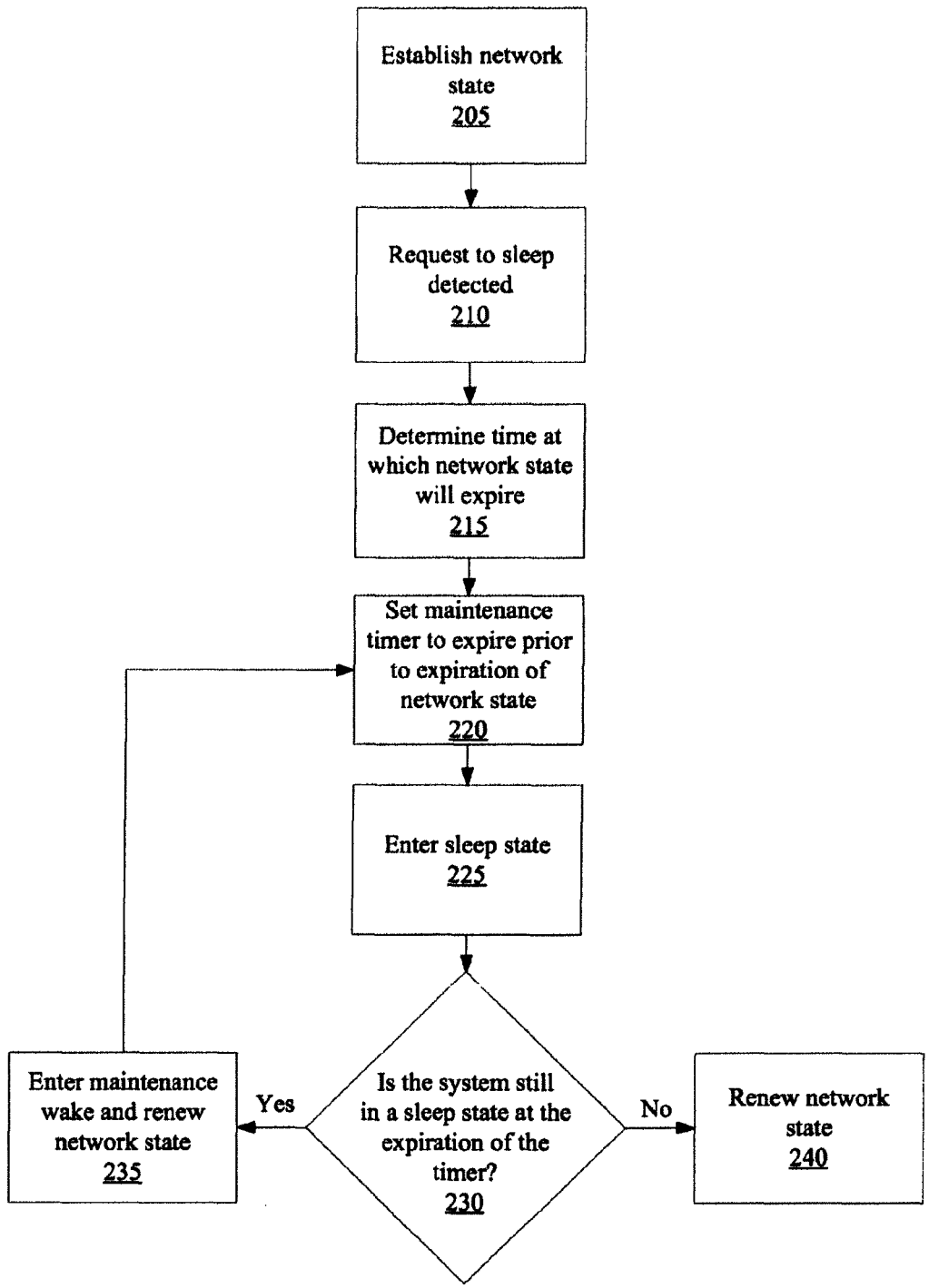
FIG. 2 is a flow chart that illustrates an exemplary dark wake process according to an embodiment.

FIG. 2 is a flow chart that illustrates an exemplary dark wake process according to an embodiment. The computer system 100 establishes one or more network states at block 205. For one embodiment the network state is one or more of the following: obtaining an Internet Protocol ("IP") address lease from a Dynamic Host Configuration Protocol ("DHCP") server, registration a proxy server (e.g., a sleep proxy server), establishing a port connection with a router (e.g., using network address translation port mapping protocol ("NAT-PMP")), a File Transfer Protocol ("FTP") or Transmission Control Protocol ("TCP") connection, a virtual private network ("VPN") connection, or other network connection to a server, computer, or other networked device.

Once a network state has been established, the computer system 100 detects a request to place the computer system 100 in a low power state (e.g., asleep state) at block 210. For one embodiment, the sleep state is an Advanced Configuration and Power Interface ("ACPI") S3 sleep state.

Prior to entering the sleep state, the computer system 100 determines a time at which one or more network states will expire at block 215. This expiration time may be a known according to a protocol standard or specification, set by the server, computer, or networked device when the computer system 100 establishes a network state, a scheduled time set by the computer system 100 to update a networked device, or otherwise determined by known methods.

Using the determined time, the computer system 100 sets a maintenance timer to expire prior to the expiration of the network state at block 220. For one embodiment, the computer system 100 utilizes the computer system's real-time clock ("RTC") to track time in a low power mode. For one embodiment, if more than one network state has been established, the computer system 100 sets the timer based upon the network state that will expire first. The maintenance timer is set to expire prior to the expiration of the network state—e.g., at 75% of the network state expiration period. Alternatively, the computer system 100 sets a timer for each of multiple network states.

The computer system 100 enters a low power or sleep state at block 225. For example, the computer system 100 places the RAM 115 in a self-refresh mode, powers down all human interface devices (e.g., mouse, keyboard, display device 135, audio/video components, etc.), the CPU 105 or one or more cores thereof, network interface(s), disk drive(s), fan controller 150 and fan 155, I/O's 145 (except for an I/O to receive/send a wake/dark wake signal—e.g., a user command to power up or the expiration of the timer), etc. Alternatively, the fan controller 150 and fan 155 continue to receive power during a low power or sleep state. For an alternate embodiment, the computer system 100 enters a hibernate state, hybrid sleep state, or other low power mode at block 225.

If the computer system 100 is still in asleep state at the expiration of the time at block 230, the computer system enters a maintenance wake (or dark wake) power state to renew the network state at block 235. The computer system 100 powers up components necessary to maintain the network state, e.g., a CPU and a network interface. The computer system 100 then renews the network state (e.g., renews an IP address lease from a DHCP server or other network connection) or otherwise updates a network state (e.g., sends/receives data to/from another networked device). For one embodiment, the computer system 100 is a multi-processor or multi-core system and only powers up a single processor or a single core of a multi-core processor during the maintenance wake.

For one embodiment the computer system 100, during a maintenance wake, does not power up user-perceptible and other components that are not essential to maintaining the network state. For example, audio and video components (including the display device 135) and human interface devices are not powered up during the maintenance wake. For one embodiment, the hard drive 120 is also not powered up, e.g., via control of the hard drive motor controller, during the maintenance wake.

For an alternate embodiment, the computer system 100 performs aback up over a local connection (e.g., via a USB connection), monitors an internal or peripheral device, or performs a form of internal maintenance (e.g., a disk check, defragmentation, etc.) during the maintenance wake in addition to or instead of maintaining a network state. For this embodiment, the computer system 100 powers up components that are essential to the maintenance performed, but does not power up user-perceptible and other components that are not essential to maintenance performed. For example, the computer system 100 may have a timer set to back up the hard drive 120 or check the state of an internal or attached device on a scheduled basis and this embodiment would allow one or more tasks to be completed when a scheduled task is triggered during a sleep state without powering up the entire computer system 100 and while appearing to a user, at least in part, to remain in a sleep state.

Upon the completion of maintaining the network state, and without receiving a request to return to an awake/full-power state, the computer system 100 sets the timer and reenters a sleep state in blocks 220 and 225. If the computer system 100 is awake when the maintenance timer expires, the computer system 100 maintains the network state and resumes normal operation at block 240.

While described in a particular order, the steps of this exemplary process may be performed in a different order. For example, the computer system 100 may determine the time at which the network state will expire and set a maintenance timer prior to detecting a request to place the computer system 100 in a sleep state.

Figure 3:
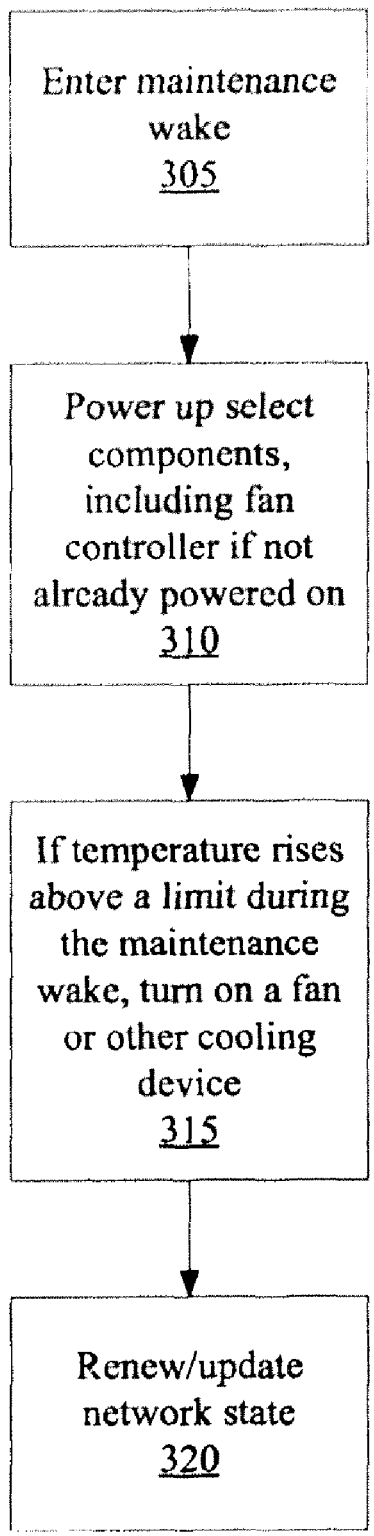
FIG. 3 is a flow chart that illustrates further detail of an exemplary dark wake process according to an embodiment.

FIG. 3 is a flow chart that illustrates further detail of block 235 of FIG. 2 according to one embodiment. The computer system 100 enters a maintenance wake state at block 305. The computer system 100 powers up select components at block 310. The select components are powered up to perform the maintenance of a network state—e.g., a network interface and a processor or processor core. User perceptible components, such as audio, video, human interface devices or peripherals, and spinning of a hard drive 120, remain in the sleep state. As a result, the computer system 100 appears to a user to be asleep during maintenance wake. Alternatively, the hard drive 120 may be powered on during maintenance wake.

For one embodiment, the computer system 100 powers up a fan controller 150 to enable the running of a fan, if needed, to protect the system from overheating during the maintenance wake period. Alternatively, the fan controller receives power even while the system is in one or more levels of sleep.

If a temperature rises above a predetermined limit during the maintenance wake, the fan controller 150 turns on a fan or other cooling device to cool down the computer system 100 at block 315. Additionally, if a temperature falls below a predetermined limit, the fan controller 150 can turn a fan or other cooling device off. For one embodiment the fan 155 has been powered up during the maintenance wake, but is not turned on until activated by the fan controller 150. Alternatively, the fan 155 is powered up and turned on by the fan controller 150 when needed.

The computer system 100 renews or otherwise updates a network state at block 320. As described herein, renewing or updating a network state may include renewing or maintaining an IP address lease with a DHCP server, registration with a proxy server (e.g., a sleep proxy server), a port connection with a router, an FTP, VPN, TCP, or other network connection to a server, computer, or other networked device, or otherwise performing a scheduled update or transmission of information to a networked device.

Figure 4:
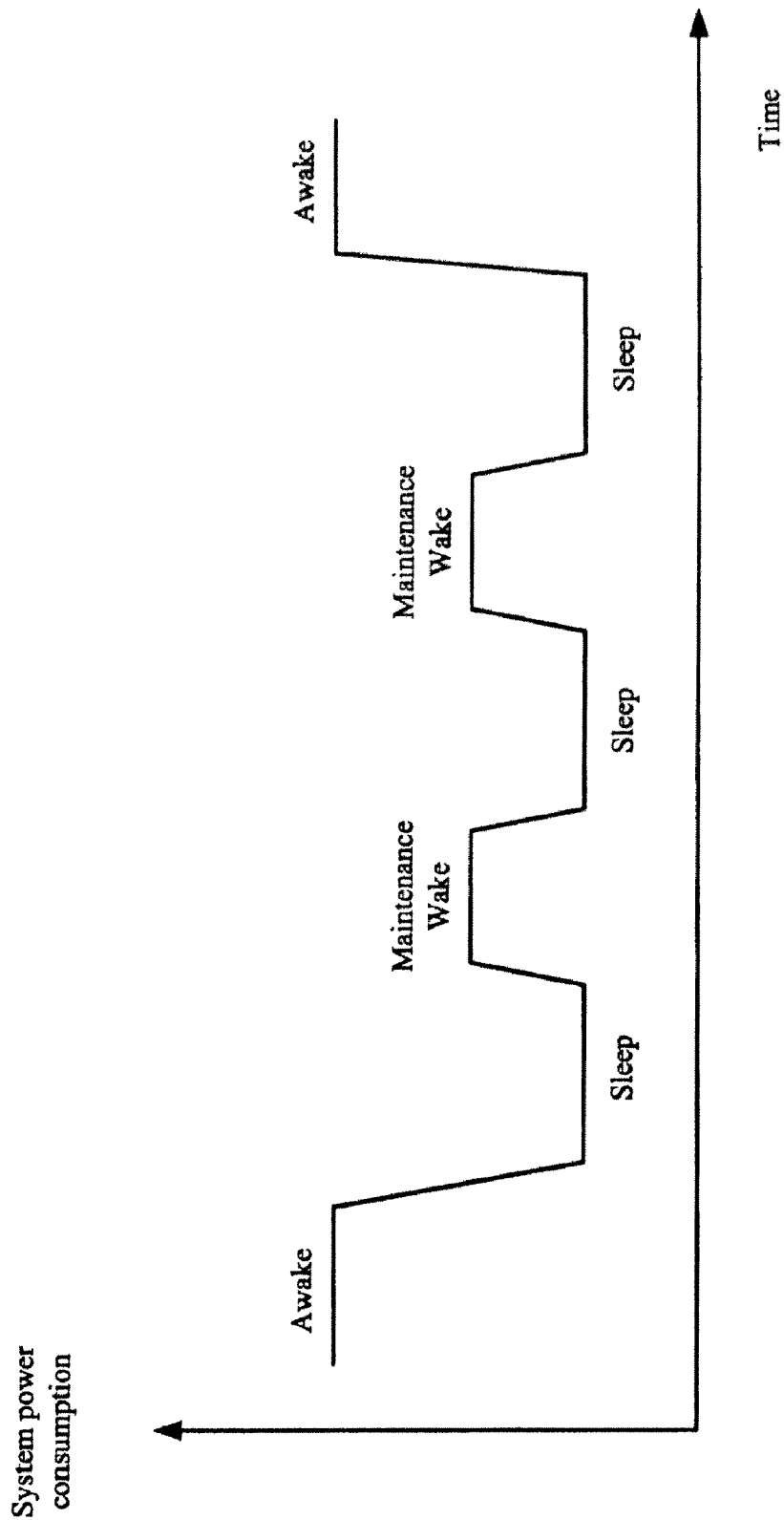
FIG. 4 illustrates an exemplary chart of system power consumption over time, including an awake period, sleep period, and dark wake period according to an embodiment.

FIG. 4 is an exemplary chart of system power consumption over time, including awake periods, sleep periods, and maintenance wake (dark wake) periods according to an embodiment. The exemplary chart of FIG. 3 shows the computer system 100 entering and exiting various power states over time. The computer system 100 begins at full power in an "awake" state. As described above with reference to FIG. 2, the computer system can establish a network state and then maintain that network state after entering a sleep state. The two periods of maintenance wake shown in FIG. 4 illustrate that the computer system 100 powers up only select components to maintain the network state—i.e., the computer system 100 consumes more power than in sleep mode because of its use of a CPU/core and network interface, but is not required to resume a full power (awake) mode to maintain the network state or otherwise terminate the network state before or during a sleep state (e.g., due to expiration). FIG. 4 illustrates the computer system 100 performing two maintenance wake cycles and returning to a sleep state each time before returning to an awake state. The illustrated number of power cycles is exemplary—the computer system 100 can enter and exit maintenance wake more or less times during a sleep period and during more than one overall sleep period.

In the foregoing specification, the invention has been described with reference to specific exemplary embodiments thereof. It will be evident that various modifications may be made thereto without departing from the broader spirit and scope of the invention as set forth in the following claims. An article of manufacture may be used to store program code providing at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention. The specification and drawings are, accordingly, to be regarded in an illustrative sense rather than a restrictive sense.

What is claimed is:

1. A computer-implemented method comprising:
establishing a network state for the computer, wherein the network state will expire in a set amount of time;
setting a maintenance timer to expire prior to the expiration of the network state;
placing the computer in a sleep state without terminating the network state, wherein placing the computer in a sleep state includes powering down a fan controller, wherein the fan controller includes processing logic that determines, using information from temperature sensors, whether to turn a fan on or off;
powering up select components of the computer from the sleep state at the expiration of the maintenance timer, wherein the select components include a network interface, the fan controller, and a processor core and wherein the select components do not include a display, human interface devices, and audio components;
renewing the network state; and
powering down the select components of the computer to return the computer to the sleep state, and wherein the fan controller receives power during the renewing of the network state and receives no power during the sleep state.

2. A computer-implemented method comprising:
establishing, with a server, a lease of a network address for the computer, wherein the network address will expire in a set amount of time;
placing the computer in an Advanced Configuration and Power Interface ("ACPI") S3 sleep state without terminating the lease, wherein placing the computer in the ACPI S3 sleep state includes powering down a fan controller, wherein the fan controller includes processing logic that determines, using information from temperature sensors, whether to turn a fan on or off;
powering up select components of the computer from the sleep state prior to the expiration of the set amount of time to maintain the lease, wherein the select components include a network interface and the fan controller, and do not include a display;
renewing the lease with the server, wherein the fan controller turns on the fan when the fan controller determines that the temperature within the computer has exceeded a threshold to cool the computer during renewal of the lease and prior to the computer returning to the sleep state; and
powering down the select components of the computer to return the computer to the sleep state, and wherein a fan controller receives power during the renewing of the lease with the server and receives no power during the sleep state.

3. The computer-implemented method of claim 1, wherein the fan controller is configured to cause the fan to be turned on after powering up the select components.

4. The computer-implemented method of claim 1, wherein maintaining the network state includes renewing an Internet Protocol ("IP") address lease with a Dynamic Host Configuration Protocol ("DHCP") server.

5. The computer-implemented method of claim 1, wherein maintaining the network state includes renewing a registration with a sleep proxy server or maintaining a port connection with a router.

6. The computer-implemented method of claim 1, wherein the computer includes a multi-core processor, the sleep state powers down the multi-core processor, and wherein powering up select components of the computer from the sleep state includes powering up only a single processor core of the multi-core processor.

7. The computer-implemented method of claim 1, wherein the fan controller determines, during maintenance of the network state, that the temperature within the computer has exceeded a threshold and turns on the fan to cool the computer prior to the computer returning to the sleep state.

8. The computer-implemented method of claim 1, wherein the sleep state is an Advanced Configuration and Power Interface ("ACPI") S3 sleep state.

9. The computer-implemented method of claim 2, wherein the fan controller is configured to cause the fan to be turned on after powering up the select components.

10. The computer-implemented method of claim 2, wherein renewing the lease with the server includes renewing an Internet Protocol ("IP") address lease with a Dynamic Host Configuration Protocol ("DHCP") server.

11. The computer-implemented method of claim 2, wherein renewing the lease with the server includes renewing a registration with a sleep proxy server.

12. The computer-implemented method of claim 2, wherein the computer includes a multi-core processor, the sleep state powers down the multi-core processor, and wherein powering up select components of the computer from the sleep state includes powering up only a single processor core of the multi-core processor.

13. The computer-implemented method of claim 2, wherein the fan controller determines, during maintenance of the network state, that the temperature within the computer has exceeded a threshold and turns on the fan to cool the computer prior to the computer returning to the sleep state.

14. A non-transitory machine-readable storage medium storing instructions that, when executed, cause a machine to perform a method comprising:
    establishing a network state for the computer, wherein the network state will expire in a set amount of time;
    setting a maintenance timer to expire prior to the expiration of the network state;
    placing the computer in a sleep state without terminating the network state, wherein placing the computer in a sleep state includes powering down a fan controller, wherein the fan controller includes processing logic that determines, using information from temperature sensors, whether to turn a fan on or off;
    powering up select components of the computer from the sleep state at the expiration of the maintenance timer, wherein the select components include a network interface, the fan controller, and a processor core and wherein the select components do not include a display, human interface devices, and audio components;
    renewing the network state; and
    powering down the select components of the computer to return the computer to the sleep state, and wherein a fan controller receives power during the renewing of the network state and receives no power during the sleep state.

15. The non-transitory machine-readable storage medium of claim 14, wherein the fan controller is configured to cause the fan to be turned on after powering up the select components.

16. The non-transitory machine-readable storage medium of claim 14, wherein maintaining the network state includes renewing an Internet Protocol ("IP") address lease with a Dynamic Host Configuration Protocol ("DHCP") server.

17. The non-transitory machine-readable storage medium of claim 14, wherein maintaining the network state includes renewing a registration with a sleep proxy server or maintaining a port connection with a router.

18. The non-transitory machine-readable storage medium of claim 14, wherein the computer includes a multi-core processor, the sleep state powers down the multi-core processor, and wherein powering up select components of the computer from the sleep state includes powering up only a single processor core of the multi-core processor.

19. The non-transitory machine-readable storage medium of claim 14, wherein the fan controller determines, during maintenance of the network state, that the temperature within the computer has exceeded a threshold and turns on the fan to cool the computer prior to the computer returning to the sleep state.

20. The non-transitory machine-readable storage medium of claim 14, wherein the sleep state is an Advanced Configuration and Power Interface ("ACPI") S3 sleep state.

* * * * *